C. E. G. SCHOENKNECHT.
BICYCLE.
APPLICATION FILED JAN. 11, 1921.
1,394,866. Patented Oct. 25, 1921.
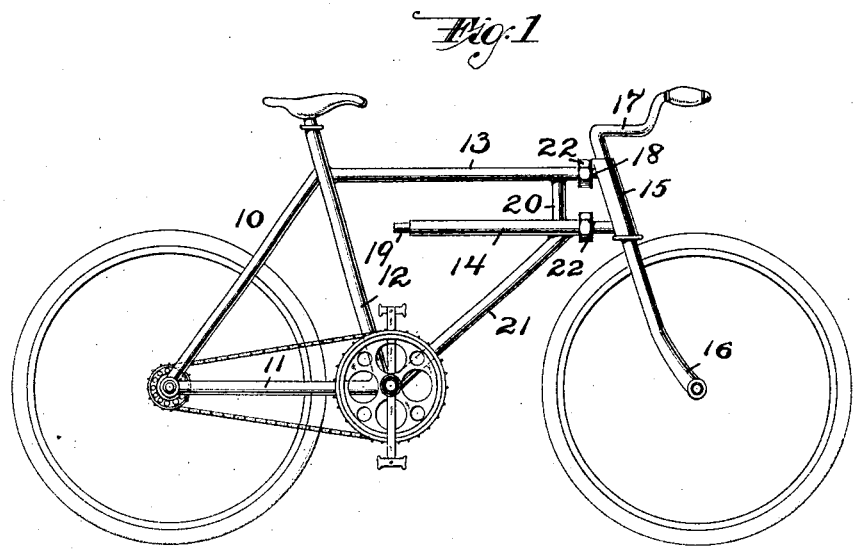
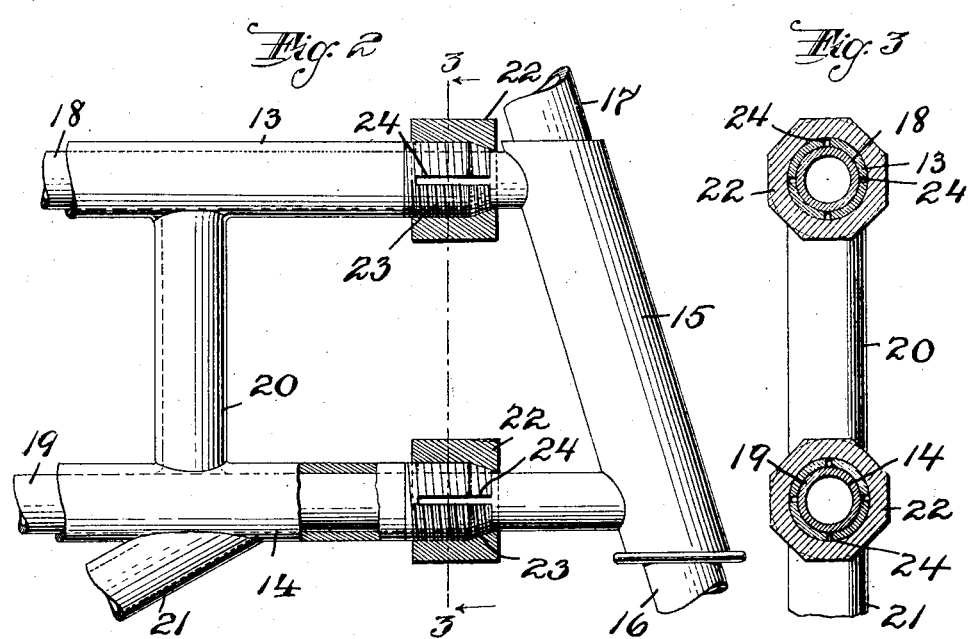

UNITED STATES PATENT OFFICE.

CURT E. G. SCHOENKNECHT, OF NEWARK, NEW JERSEY.

BICYCLE.

1,394,866.      Specification of Letters Patent.      Patented Oct. 25, 1921.

Application filed January 11, 1921. Serial No. 436,413.

*To all whom it may concern:*

Be it known that I, CURT E. G. SCHOENKNECHT, a citizen of the United States, and a resident of Newark, county of Essex, and State of New Jersey, have invented certain new and useful Improvements in Bicycles, of which the following is a specification.

This invention relates to an improved bicycle frame which is as strong as the old type of frame, but which has the added advantage of being adjustable as to its length, thereby making it possible to provide more comfort for the rider, and also permitting the installation of carrying devices on the frame.

The invention is illustrated in the accompanying drawing, in which Figure 1 is a side view of my improved bicycle. Fig. 2 is a detail view of the adjustable part of the frame, and Fig. 3 is a section on line 3—3 in Fig. 2.

The bicycle frame is, in general outline, the same as an ordinary frame, the rear part carrying the seat and the front part carrying the handle. The frame is made up of two members, the rear member and the front member. The rear member resembles the usual type of the back part of a bicycle having the rear reaches 10, the brace 11, the main post 12 and the top bar 13. The top bar is tubular, and under it is a parallel tube 14 which forms a lower bar.

The front member has the usual steering head 15, on top of a fork 16, supporting the handle bar 17. The steering head 15 has a pair of rearwardly projecting rods 18 and 19 which slide into the tubes 13 and 14, and while they fit snugly, they can be moved longitudinally when not locked. I brace the two tubes 13 and 14 by a cross-brace 20 which is located slightly in rear of the front ends of the tubes and about where the truss 21 connects to the lower tube 14.

I provide means for locking the tubes to the rods so as to permit proper adjustment. The form shown comprises nuts 22 which are tapered on the inside and fit over the screw-threaded ends 23 of the tubes 13 and 14. These screw-threaded ends are, of course, tapered also to fit the taper of the nuts 22, and the nuts fit tightly over the rods 18 and 19 so that they close the joint, as will be readily seen from Fig. 2.

The screw-threaded ends of the rods are split, as at 24, so that they can be tightly compressed by the nuts 22 and thus the parts are tightly locked in adjusted positions, so that the frame can not accidentally become elongated or shortened.

The usual adjustment of the handle bars is possible, but in addition to this the frame can be lengthened so that the rider's knees will not engage the handle bars even when the handle bars are of the type that curve rearward from the steering post.

I claim:

1. A bicycle comprising a rear frame member including a main post, a top tube, a lower tube, said tubes being parallel their entire length, the lower tube having its rear end free, a brace connecting the tubes adjacent their front ends, a truss connecting the bottom part of the main post with the bottom tube beneath the brace, a front frame member including a steering head, and rods rigidly secured to the steering head and alined with said tubes, and means for adjustably securing the rods in the tubes.

2. A bicycle comprising a rear frame member of the usual truss type and including parallel tubes at the top, a front frame member having the usual steering head and two parallel rods to slide in the tubes, the ends of the tubes being threaded and tapered and also being split, and nuts tapered and being adapted to screw on the ends of the tubes to cause them to bind on the rods so as to hold the rods in adjusted positions and to close the joint.

3. A bicycle comprising a rear frame member including a main post, a top tube, a lower tube, said tubes being parallel for their entire length, a truss connecting the bottom of the main post with the front part of the lower tube, and a cross brace connecting the front ends of the two tubes, a front frame member including a steering head and vertically alined rods disposed so as to slide in the tubes, and means for securing the rods in adjusted positions in the tubes.

In testimony that I claim the foregoing, I have hereto set my hand, this 8th day of January, 1921.

CURT E. G. SCHOENKNECHT.